(12) United States Patent
Itomi

(10) Patent No.: US 8,339,127 B2
(45) Date of Patent: Dec. 25, 2012

(54) ROTATION SENSOR UNIT

(75) Inventor: Shoji Itomi, Kawana (JP)

(73) Assignee: NTN Corporation, Osaka (JP)

( * ) Notice: Subject to any disclaimer, the term of this patent is extended or adjusted under 35 U.S.C. 154(b) by 396 days.

(21) Appl. No.: 12/674,686

(22) PCT Filed: Aug. 22, 2008

(86) PCT No.: PCT/JP2008/064977
§ 371 (c)(1), (2), (4) Date: Feb. 23, 2010

(87) PCT Pub. No.: WO2009/028407
PCT Pub. Date: Mar. 5, 2009

(65) Prior Publication Data
US 2011/0127997 A1    Jun. 2, 2011

(30) Foreign Application Priority Data
Aug. 28, 2007    (JP) .................. 2007-221193

(51) Int. Cl.
*G01B 7/30* (2006.01)
(52) U.S. Cl. .................. 324/207.25; 324/173
(58) Field of Classification Search ............ 324/207.25, 324/173
See application file for complete search history.

(56) References Cited

U.S. PATENT DOCUMENTS
5,657,544 A * 8/1997 Ota et al. .................. 33/1 N
2007/0182283 A1   8/2007 Itomi

FOREIGN PATENT DOCUMENTS

| JP | 62-229026 | 10/1987 |
|----|-----------|---------|
| JP | 6-76805 | 10/1994 |
| JP | 2002-116027 | 4/2002 |
| JP | 2003-214896 | 7/2003 |
| JP | 2004-271451 | 9/2004 |
| JP | 2007-147381 | 6/2007 |

OTHER PUBLICATIONS

JPO Notice of Reasons for Rejection (with English translation) issued Jan. 10, 2012 in a counterpart Japanese application, 2007-221193.
International Search Report issued Sep. 16, 2008 in International (PCT) Application No. PCT/JP2008/064977.

* cited by examiner

*Primary Examiner* — Reena Aurora
(74) *Attorney, Agent, or Firm* — Wenderoth, Lind & Ponack, LLP.

(57) ABSTRACT

In a rotation sensor unit, a lid 6 is pressed against a housing 2 to push an outer race 11 of a rolling bearing 1, thereby applying a preload to the bearing 1 and increasing the rigidity of the bearing 1, so as to prevent run-out of a shaft 3. An encoder 42 is supported on this shaft 3, and a magnetic sensor element 41 is supported on the lid 6, which is pressed against the housing 2. Thus, it is possible to prevent displacement of the magnetic sensor element 41 and the encoder 42 relative to each other. The shaft 3, lid 6 and outer race 11, etc. are made of a soft magnetic material to define a magnetically shielded space between one axial end surface of the shaft 3 and the lid 6, with the magnetic sensor element 41 mounted in the magnetically shielded space.

9 Claims, 2 Drawing Sheets

ROTATION SENSOR UNIT

TECHNICAL FIELD

This invention relates to a rotation sensor unit including a magnetic encoder for detecting the rotation of a shaft.

BACKGROUND ART

The most widely used rotation sensor units of this type include a housing in which the outer race of a rolling bearing is fitted, a shaft supported by the rolling bearing, and a magnetic encoder for detecting the rotation of the shaft. When using a magnetic encoder as a rotation sensor, if magnetic fluxes of an external magnetic field enter the magnetic sensor element of the magnetic encoder, its measurement accuracy decreases. Thus, the magnetic sensor element is typically mounted in a magnetic shield (JP Patent Publication 62-229026A).

For example, the rotation sensor unit disclosed in JP Patent Publication 62-229026A includes a shaft having its one end protruding from a housing, a duplex bearing supporting the shaft, an encoder mounted on the outer periphery of the shaft at its portion protruding from the housing, and a magnetic sensor element supported on the housing at its one end so as to radially face the encoder. The rotation sensor unit further includes a magnetic shield cover enclosing the housing, magnetic sensor element and encoder, and a protective cover enclosing the magnetic shield cover. By supporting the shaft with the duplex bearing, it is possible to prevent displacement of the magnetic sensor element and the encoder relative to each other. The protective cover is of a rigid structure to protect the magnetic sensor element, the circuit board, etc. from outside. By providing the protective cover and the magnetic shield cover separately from each other, the protective cover can be made of a lightweight non-magnetic material such as die-cast aluminum for high productivity.

If the magnetic shield cover is omitted, the protective cover can be made of a rigid ferromagnetic material, i.e. cast iron to use the protective cover as a magnetic shield too.

In the case of a rotation sensor unit having a protective cover like the one disclosed in JP Patent Publication 62-229026A, because the magnetic sensor element can be protected by the protective cover, it is sometimes required that not only the protective cover but also the housing be made of die-cast aluminum or resin. But if the housing is made of a non-magnetic material such as resin or aluminum, magnetic fluxes of an external magnetic field pass through the housing, thus decreasing measurement accuracy of the magnetic encoder under the influence of an external magnetic field.

Further, if the protective cover is omitted or if the protective cover and the housing are made of a non-magnetic material, it is necessary to provide a dedicated magnetic shield cover, which increases the number of component parts. Particularly if the protective cover is omitted, and the housing is made of a non-magnetic material, it is necessary to provide a large-sized magnetic shield cover that needs a large installation space, which in turn increases the size of the entire rotation sensor unit. Also, smaller magnetic encoders are used today and it is required to minimize displacement of the magnetic sensor unit and the encoder relative to each other.

SUMMARY OF THE INVENTION

An object of the present invention is, in a rotation sensor unit comprising a housing in which the outer race of a rolling bearing is fitted, a shaft supported by this rolling bearing, and a magnetic encoder for detecting the rotation of the shaft, to shield the magnetic sensor element from external magnetic field without depending on a dedicated magnetic shield cover or the housing, while preventing displacement of the magnetic sensor element and the encoder relative to each other.

In order to achieve this object, the present invention provides a rotation sensor unit comprising a housing in which an outer race of a rolling bearing is fitted, a shaft supported by the rolling bearing, and a magnetic encoder for detecting the rotation of the shaft, characterized in that the rotation sensor unit further comprises a lid facing one axial end surface of the shaft and axially pressed against one end of the housing, the lid axially pressing one end surface of the outer race of the rolling bearing, thus applying a preload to the rolling bearing, that the magnetic encoder includes an encoder supported on the shaft, and a magnetic sensor element supported on the lid and disposed between the lid and the one axial end surface of the shaft, that the lid, the shaft and the outer race are made of a magnetic material, and that a magnetically shielded space is defined by the lid, the one axial end surface of the shaft and the outer race in which the magnetic sensor element is mounted.

Specifically, by providing the lid to be pressed against the one end of the housing, the lid axially pushes one end surface of the outer race, thereby applying a preload to the rolling bearing. By applying a preload to the bearing, it is possible to increase the rigidity of the bearing, thus preventing run-out of the shaft.

By supporting the encoder of the magnetic encoder on the shaft, of which run-out is prevented, and by supporting the magnetic sensor element of the magnetic encoder on the lid to be pressed against the housing, it is possible to prevent displacement of the magnetic sensor element and the encoder relative to each other.

By arranging the lid so as to face the one end surface of the shaft, a space is defined between the lid and the one end surface of the shaft. Since the lid presses the one end surface of the outer race to apply a preload to the bearing, the space between the lid and the one end surface of the shaft is surrounded by the lid and the outer race. Thus, by making the lid, the shaft and the outer race from a non-magnetic material, a magnetically shielded space is defined by the lid, shaft and outer race which magnetic fluxes of an external magnetic field cannot directly enter.

By providing the magnetic sensor element in this magnetically shielded space, it is possible to shield the magnetic sensor element from an external magnetic field without depending on a dedicated magnetic shield cover or the housing.

Preferably, the inner race of the rolling bearing and rolling elements disposed between the inner and outer races are made of a magnetic material.

By making the inner race and the rolling elements from a magnetic material, magnetic fluxes of an external magnetic field are intercepted by the inner race and the rolling elements too, so that they are less likely to pass through the bearing and directly enter the space between the lid and one end surface of the shaft. Thus, it is possible to define a larger magnetically shielded space.

Magnetic fluxes of an external magnetic field can enter the annular space between the inner and outer races of the rolling bearing from its other axial end such that they are inclined toward the other axial end relative to a radial plane. If the inner race and the rolling elements are made of a non-magnetic material, magnetic fluxes may pass therethrough and directly enter the space between the lid and the one end surface of the shaft. One way to prevent this would be to increase the width of the outer race. But increasing the width of the outer race means its weight will also increase, which is not preferable. By making the inner race and the rolling elements from a magnetic material, it is possible to intercept, with the inner race or the like, magnetic fluxes of an external magnetic field that may enter the annular space between the inner and outer races with an inclination angle. Magnetic fluxes that have been intercepted by the rolling elements are bypassed to the inner and outer races because the rolling elements are kept in contact with the inner and outer races due to the preload applied to the rolling bearing.

Provided measurement by the magnetic encoder is not impaired, the kind of the rolling bearing or bearings, the number of rolling bearings mounted in the housing, and the structure of the duplex bearing comprising a plurality of rolling bearings are not limited.

The magnetic materials forming the shaft, lid, outer race, inner race and rolling elements may not be identical in physical properties to each other, but may have different physical properties from each other depending on the functional requirements for the respective members. Such magnetic materials include iron, silicon steel, permalloy, sendust, permendur and soft ferrite.

In order to apply a preload, the lid may be directly pressed against the one end surface of the outer race, or may be pressed against the one end surface of the outer race through an endless annular spacer disposed therebetween.

When the lid is directly pressed against the one end surface of the outer race, if the one end surface of the shaft and the surface of the lid that faces the one end surface of the shaft are parallel to each other, it is difficult to define a sufficiently large magnetically shielded space therebetween. In this case, by forming a recess in at least one of the one end surface of the shaft and the surface of the lid facing the one end surface of the shaft, it is possible to increase the distance between these opposed surfaces, thereby increasing the space therebetween.

But if it is desired to omit the trouble of forming such a recess, a spacer ring made of a magnetic material may be disposed between the one end surface of the outer race and the lid.

Such a spacer ring separates the one end surface of the shaft from the lid, thereby increasing the above space. This makes it possible to form the one end surface of the shaft and the surface of the lid facing the one end surface as simple flat surfaces which can be formed easily.

Thus, according to the present invention, because the magnetically shielded space can be defined without depending on the housing, the housing may be made of either a magnetic material or a non-magnetic material, and also the housing may be closed or have an opening.

Particularly if the hosing is made of a resin or aluminum, it is possible to reduce the weight of the housing. It is to be understood that the term "aluminum" herein used encompasses aluminum alloys too.

The housing and the lid are ordinarily made of the same material. But by making only the lid from a magnetic material, which is heavier than aluminum or resin, while making the housing from a resin or aluminum, it is possible to define the magnetically shielded space without unduly increasing the weight of the rotation sensor unit.

The housing can be made of a resin or aluminum only if no large external force acts on the housing. In such a case, it is not necessary to use a high-carbon steel having high strength as the material for the lid.

Thus, it is possible to use as the material for the lid a cold rolled steel sheet or a rolled steel material for general structural purposes.

According to the present invention, in a rotation sensor comprising a housing in which the outer race of a rolling bearing is fitted, a shaft supported by the rolling bearing, and a magnetic encoder for detecting the rotation of the shaft, a lid for applying a preload to the rolling bearing, the outer race and the shaft are made of a magnetic material, so that a magnetically shielded space is defined between the lid and one axial end surface of the shaft. By mounting the magnetic sensor element in this space, it is possible to shield the magnetic sensor element from external magnetic field without depending on a dedicated magnetic shield cover or the housing.

DEATILED DESCRIPTION OF THE INVENTION

Now the embodiments of the present invention are described with reference to the drawings.

Figure 1:
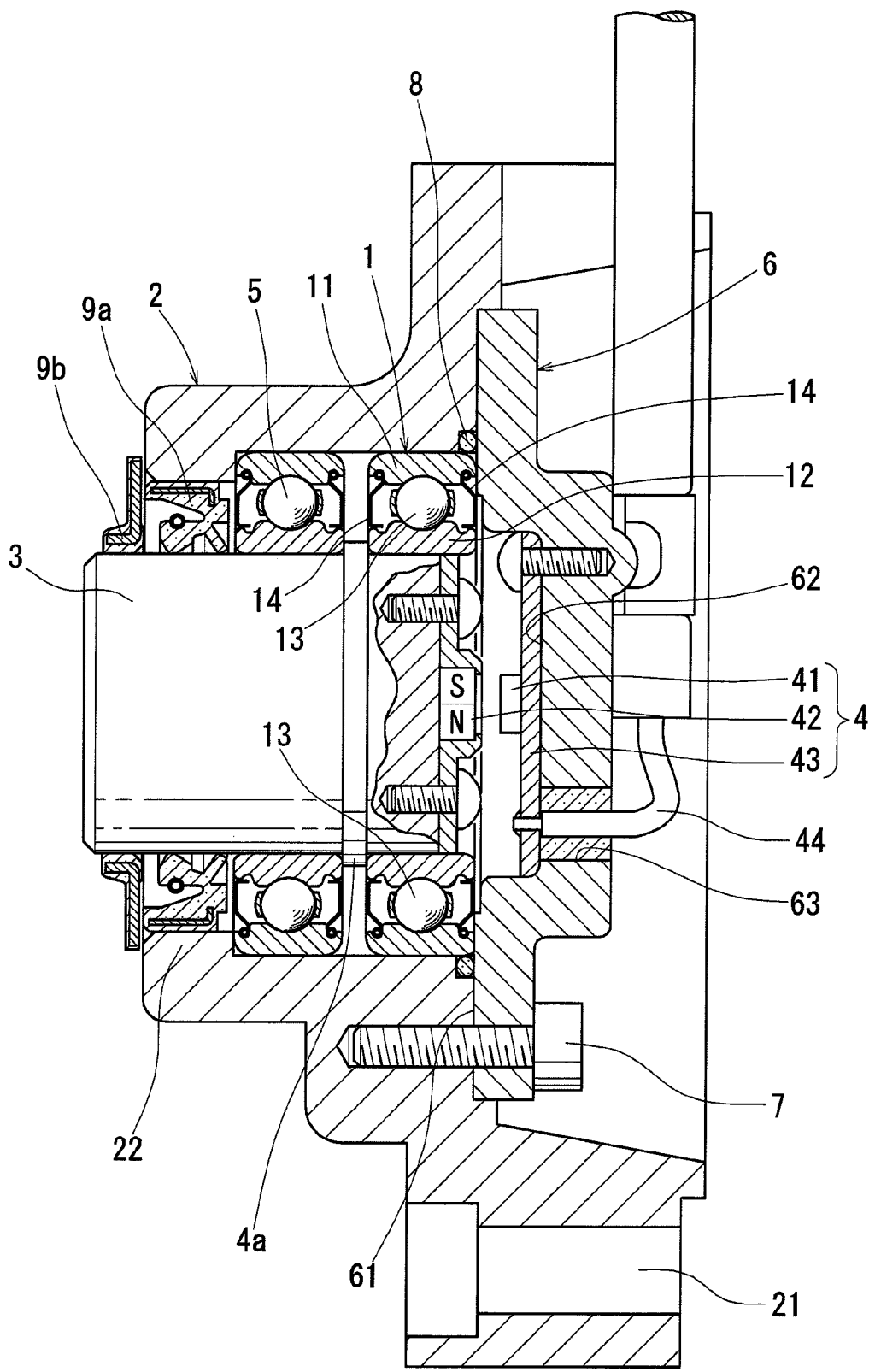
FIG. 1 is an entire sectional view of a first embodiment.

FIG. 1 is an axial sectional view of the entire rotation sensor unit according to the first embodiment of the present invention.

As shown in FIG. 1, the rotation sensor unit according to the first embodiment comprises a housing 2 in which an outer race 11 of a rolling bearing 1 is fitted, a shaft 3 supported by the rolling bearing 1, and a magnetic encoder 4 for detecting the rotation of the shaft 3.

Another rolling bearing 5, which forms a duplex bearing in cooperation with the rolling bearing 1, is mounted between the housing 2 and the shaft 3. In view of rotational inertia resistance, the rolling bearings 1 and 5 are both ball bearings with seals.

The housing 2 has a mounting flange 21 on the outer periphery thereof so that the housing can be screwed to another device after the rotation sensor unit has been assembled.

The rotation sensor unit of the first embodiment is intended to be protected from external force with a separate cover or used under conditions where the housing 2 is never destroyed by external force. Thus, the housing 2 is made by injection molding of a resin so that the housing is lighter in weight and can be formed more easily, rather than for increased strength. But the housing 2 may be made of aluminum.

The shaft 3, the outer and inner races 11 and 12 of the rolling bearing 1, and rolling elements 13 disposed between the outer and inner races 11 and 12 are made of a soft magnetic material to prevent magnetization of e.g. the shaft 3. Such a soft magnetic material may be a ferrous soft magnetic material.

The rolling bearing 1 includes seals 14 each having a shield plate portion extending from a mounting end which is press-fitted in a seal groove formed in the outer race 11. The shield plate portion of each seal 14 is made of a soft magnetic material so that magnetic fluxes of an external magnetic field cannot pass through the shield plate portions of the seals 14. The shield plate portions of the seals 14 may be soft magnetic stainless steel plates.

A bearing mounting opening is defined at one end of the housing 2 and is covered by a lid 6 pressed axially against one end surface of the housing 2. The lid 6 has an axial surface comprising a radially outer portion 61 pressed against the one end surface of the housing 2 and the one end surface of the outer race 11, and a recessed portion 62 axially facing the one end surface of the shaft 3 and the inner race 12 and axially displaced from the radially outer portion 61. The lid 6 has its radially outer portion 61 fixed to the housing 2 by bolts 7. In this state, the recessed portion 62 of the lid 6 axially faces the one end surface of the shaft 3 with a space left between the lid 6 and the shaft 3 in which the magnetic encoder 4 can be mounted.

Taking into consideration the use conditions mentioned above, the lid 6 is made of a cold-rolled steel sheet for improved formability, rather than for increased strength.

By pressing the radially outer portion 61 of the lid 6 against the one end surface of the housing 2 with the bolts 7, the one end surface of outer race 11 is axially pressed against the radially outer portion 61 over the entire area thereof. As a result, a fixed position preload is applied to the rolling bearings 1 and 5 by a shoulder 22 of the housing 2, a spacer 4a of the shaft 3, and the lid 6. The preload increases rigidity of the rolling bearings 1 and 5, thereby preventing run-out of the shaft 3.

The other end surface of the shaft 3 protrudes from a shaft insertion opening defined at the other end of the housing 2, and thus can be connected to a rotary shaft of an external device.

A packing 8 provides a seal between the radially outer portion 61 of the lid 6 and the housing 2. An oil seal 9a and a slinger 9b provide a seal between the shaft insertion opening of the housing 2 and the shaft 3.

The magnetic encoder 4 comprises a magnetic sensor element 41, an encoder 42, and a circuit board 43 carrying the sensor element 41. The magnetic encoder 4 may be a known one for measuring e.g. the rotational angle, rotational position, rotational speed or the number of revolutions of the shaft 3. In the first embodiment, the magnetic sensor element 41 is of the type that detects the change of two sets of magnetic fluxes having a phase difference of 90° from each other, and calculates the rotational angle. The encoder 42 is of the type including N and S poles that are magnetized alternately in the circumferential direction.

The magnetic sensor element 41 is supported on the lid 6 by fixing the circuit board 43 to the bottom of the recessed portion 62 of the lid 6. Specifically, the flat back surface of the circuit board 43 is supported on the radial flat surface of the recessed portion 62 so that the magnetic sensor element 41 faces in the axial direction. The circuit board 43 is screwed to the recessed portion 62 of the lid 6 and insulated from the lid 6.

The encoder 42 is fixed to and supported on the one end surface of the shaft 3 with a mounting fixture such that its rotation axis coincides with the rotation axis of the shaft 3 with a mounting fixture. For simplification of the shape, the one end surface of the shaft 3 is a radially extending flat surface.

When the encoder 42 is fixed to the shaft 3, and the lid 6 carrying the circuit board 43 is pressed against the one end surface of the housing 2, the magnetic sensor element portions for the first and the second phases, respectively, of the magnetic sensor element 41 are positioned so as to face the magnetized surface of the encoder 42 with a phase difference of 90° from each other. In this state, because the encoder 42 is supported on the shaft 3, of which run-out is prevented, and the magnetic sensor element 41 is supported on the lid 6, which is pressed against the housing 2, the magnetic sensor element 41 and the encoder 44 never displace from each other.

Wiring 44 of the circuit board 43 extends through a hole 63 formed in the recessed portion 62 to outside. The through hole 63 is closed with a filler. In order to insulate the circuit board 43, the filler must not be a magnetic material. A magnetic shield may be provided to the through hole 63 by stuffing the hole 63 first with a filler having insulating properties, and then with a filler into which is mixed magnetic powder.

In the rotation sensor unit according to the first embodiment, because a preload is applied to the rolling bearings 1 and 5 by pressing the lid 6, the radially outer portion 61 of the lid 6 and the end surface of the outer race 11 contact each other over their entire circumference. Since the space defined between the recessed portion 62 of the lid 6 and the one end surface of the shaft 3 is surrounded by the radially outer portion 61 of the lid 6 and the outer race 11, this space is shielded from the magnetic fluxes of an external magnetic field except magnetic fluxes that may penetrate into the space through the hole 63. The magnetic sensor element 41 is disposed in this magnetically shielded space. In the rotation sensor unit according to the first embodiment, since the magnetically shielded space is defined by the lid 6, which is necessary to apply a preload, and the shaft 3 and the outer race 11, which are essential elements of the rotation sensor unit, it is possible to shield the magnetic sensor element 41 from an external magnetic filed without the need for a separate dedicated magnetic shield cover or without depending on the housing 2.

For magnetic fluxes of an external magnetic field that approach the rolling bearing from the other axial end thereof, such magnetic fluxes are intercepted by the inner race 12, which is made of a magnetic material, and also by the shield plate portion of the seal 14. Further, even if such magnetic fluxes penetrate into the inner space of the rolling bearing 1 through a slight seal gap between the seal 14 and the inner race 12, since the seal gap of the seal made of a magnetic material faces the shoulder of the inner race 12, such magnetic fluxes are intercepted by the inner race 12. Thus, magnetic fluxes of an external magnetic field can never penetrate through the rolling bearing 1 directly into the space defined between the lid 6 and the one end surface of the shaft 3.

Even if the seals 14 are omitted or the shield plate portions of the respective seals 14 are not made of a magnetic material, if the inner race 12 and the rolling elements 13 are made of a magnetic material, magnetic fluxes of an external magnetic field that may enter the annular space between the inner and outer races 11 and 12 such that they are inclined toward the other axial end relative to a radial plane are intercepted by the rolling elements 13, which are revolving around the shaft, and by the inner race, and never directly enter the space between the lid 6 and the one axial end surface of the shaft 3. Magnetic fluxes of an external magnetic field that axially pass between the inner and outer races 11 and 12 may pass between the rolling elements 13, which are revolving around the shaft. But because such magnetic fluxes directly penetrate into the lid, they never directly enter the space between the lid 6 and the one axial end surface of the shaft 3.

Even if the housing 2 is made of a soft magnetic material, it is possible to reduce its weight by forming numerous through holes extending in its thickness direction. Irrespective of the arrangement of such through holes, a magnetically shielded space can be defined by the lid 6, shaft 3 and outer race 11.

Figure 2:
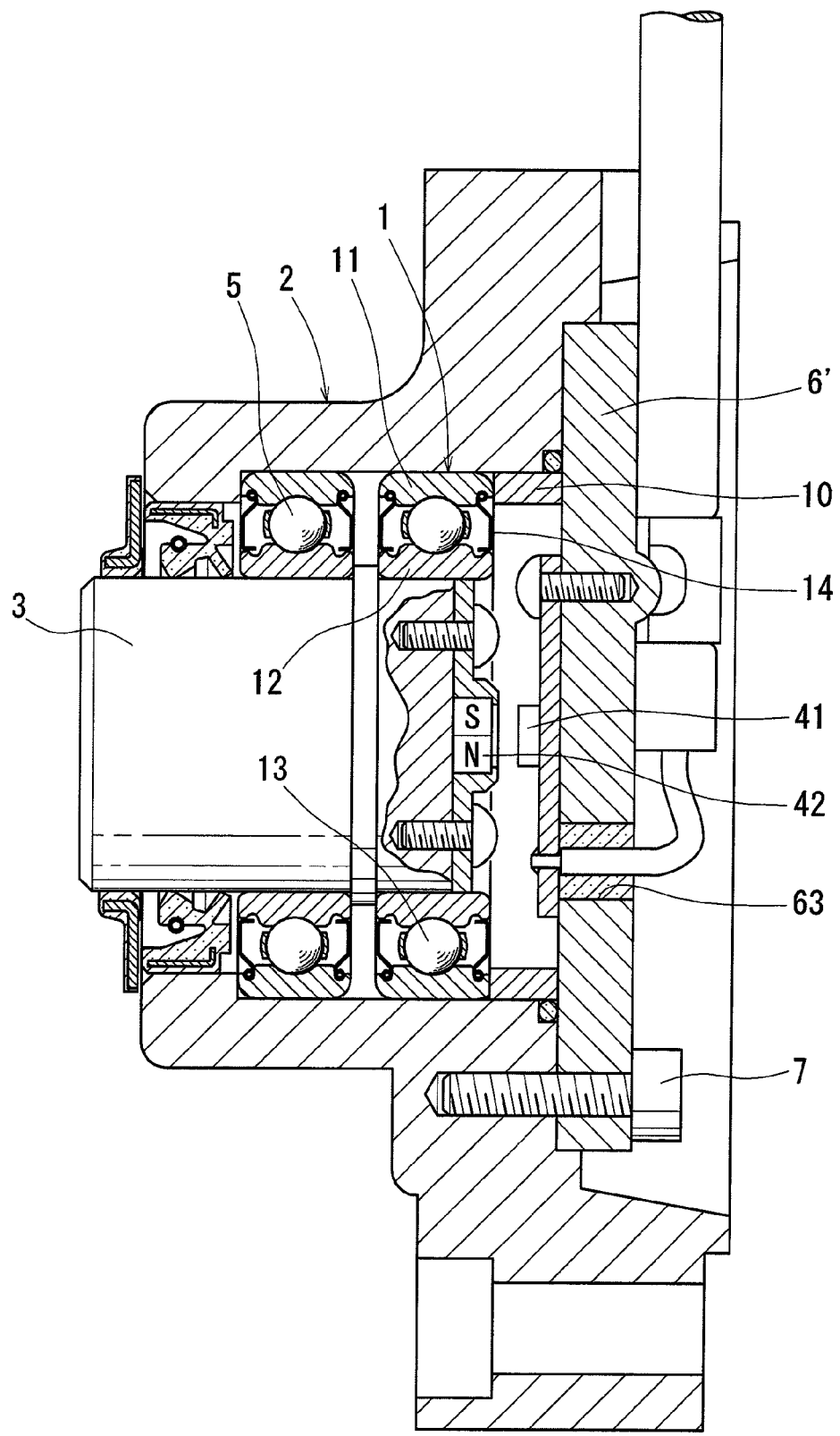
FIG. 2 is an entire sectional view of a second embodiment.

The second embodiment of the present invention is now described with reference to FIG. 2. In this description, only what differs from the first embodiment is described and what is identical to the first embodiment is not.

The rotation sensor unit of the second embodiment has a lid 6' of which the opposed side surface axially facing the shaft 3 comprises a single radial flat surface so that the lid 6' can be formed more easily.

A spacer ring 10 is disposed between the opposed side surface of the lid 6' and the one end surface of the outer race 11. The spacer ring 10 is an endless annular member having its outer periphery fitted in the inner periphery of the housing 2. The spacer ring 10 has its first end surface axially in abutment with the outer race 11 over the entire circumference of its one end surface. The lid 6' has its opposed side surface axially in abutment with the spacer ring 10 over the entire circumference of its second end surface. Thus, it is possible to define an installation space for the magnetic sensor element 41 and other elements, even though the one end surface of the shaft 3 and the opposed side surface of the lid 6' both comprise radial flat surfaces.

By pressing the lid 6' against the housing 2, the spacer ring 10 is pushed, so that the outer race 11 is pushed by the lid 6' through the spacer ring 10. This applies a fixed position preload to the rolling bearings 1 and 5. In this state, the spacer ring 10 surrounds the space defined between the lid 6' and the one axial end surface of the shaft 3. The spacer ring 10 is made of a soft magnetic material. Thus, for the rotation sensor unit of the second embodiment, the lid 6' can be formed easily and still, it is possible to define a magnetically shielded space by the lid 6', shaft 3, spacer ring 10, etc.

The spacer ring 10 is necessary to apply a preload to e.g. the rolling bearing 1. Thus, the rotation sensor unit of the second embodiment can also shield the magnetic sensor element 41 from external magnetic field without depending on a dedicated magnetic shield cover or the housing.

The invention claimed is:

1. A rotation sensor unit comprising:
   a housing,
   a rolling bearing having an inner race, an outer race, and rolling elements disposed between the inner race and the outer race, the outer race of the rolling bearing being fitted in the housing;
   a shaft supported by the rolling bearing;
   a magnetic encoder for detecting rotation of the shaft;
   a lid facing one axial end surface of the shaft and axially pressed against one end of the housing;
   wherein said lid axially presses against one end surface of the outer race of the rolling bearing over an entire circumference thereof, thus applying a preload to the rolling bearing;
   wherein the magnetic encoder includes an encoder supported on the shaft, and a magnetic sensor element supported on the lid and disposed between the lid and the one axial end surface of the shaft;
   wherein the lid and the shaft are made of magnetic material;
   wherein the inner race, the outer race, and the rolling elements of the rolling bearing are made of magnetic material; and
   wherein a magnetically shielded space is defined by the lid, the one axial end surface of the shaft and the outer race of the rolling bearing, the magnetic sensor element being mounted in the magnetically shielded space.

2. The rotation sensor unit of claim 1 further comprising a spacer ring disposed between the one end surface of the outer race and the lid over an entire circumference thereof, said spacer ring being made of magnetic material.

3. The rotation sensor unit of claim 2 wherein said housing is made of a resin or aluminum.

4. The rotation sensor unit of claim 1 wherein said housing is made of a resin or aluminum.

5. The rotation sensor unit of claim 4 wherein the lid is formed of a cold rolled steel sheet or a rolled steel material for general structural purposes.

6. The rotation sensor unit of claim 1 further comprising a spacer ring disposed between the one end surface of the outer race and the lid over an entire circumference thereof, said spacer ring being made of magnetic material.

7. The rotation sensor unit of claim 1 wherein said housing is made of a resin or aluminum.

8. The rotation sensor unit of claim 1 wherein
   the rolling bearing is a ball bearing with a seal;
   the seal has a shield plate portion extending from a mounting end which is press-fitted in a seal groove of the outer race to a distal end;
   the shield plate portion is made of magnetic material; and
   a seal gap formed between the inner race and the shield plate portion faces a shoulder of the inner race in the axial direction.

9. The rotation sensor unit of claim 1 wherein the lid has an axial surface comprising a radially outer portion that is pressed against the one end surface of the housing and the one end surface of the outer race, and a recessed portion axially facing the one end surface of the shaft and the inner race and axially displaced from the radially outer portion in a direction away from the one end surface of the shaft.

\* \* \* \* \*